United States Patent
Ransijn et al.

(10) Patent No.: US 6,552,838 B2
(45) Date of Patent: Apr. 22, 2003

(54) LINBO₃ MACH-ZEHNDER MODULATOR WITH LOW DRIVE VOLTAGE REQUIREMENT AND ADJUSTABLE CHIRP

(75) Inventors: Johannes G. Ransijn, Wyomissing Hills, PA (US); James D. Yoder, Leola, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/907,420

(22) Filed: Jul. 18, 2001

(65) Prior Publication Data

US 2003/0016430 A1 Jan. 23, 2003

(51) Int. Cl.⁷ .............................. G02F 1/03; G02F 1/00; G02F 1/035; H04B 10/04; G02B 6/10
(52) U.S. Cl. ........................ 359/245; 359/248; 359/251; 359/255; 359/237; 359/279; 359/181; 385/3; 385/4; 385/14; 385/45; 385/129; 385/132
(58) Field of Search ................... 359/245, 246, 359/247, 248, 251, 254, 237, 279, 255, 238, 124, 135, 181; 385/1, 2, 3, 4, 14, 45, 129, 130, 132

(56) References Cited

U.S. PATENT DOCUMENTS

| | | | | | |
|---|---|---|---|---|---|
| 4,763,974 | A | * | 8/1988 | Thaniyavarn | 385/3 |
| 5,138,480 | A | * | 8/1992 | Dolfi et al. | 359/251 |
| 5,694,504 | A | * | 12/1997 | Yu et al. | 385/45 |
| 5,805,321 | A | * | 9/1998 | Ooi et al. | 359/181 |
| 6,341,184 | B1 | * | 1/2002 | Ho et al. | 385/3 |

* cited by examiner

Primary Examiner—Loha Ben
(74) Attorney, Agent, or Firm—Dickstein Shapiro Morin & Oshinsky LLP

(57) ABSTRACT

An electro-optic modulator and associated method are provided. The electro-optic modulator includes an optical waveguide comprised of two pairs of coplanar modulation strips, the strips being driven by a controller circuit which applies voltages of equal amplitude and opposite polarity to the strips of each pair. The voltage applied to the first pair of strips may differ from the voltage applied to the second pair of strips, so that a chirp factor may be adjusted if desired. The modulator and associated method exhibit reduced drive voltage requirements.

37 Claims, 9 Drawing Sheets

FIG. 1 [PRIOR ART]
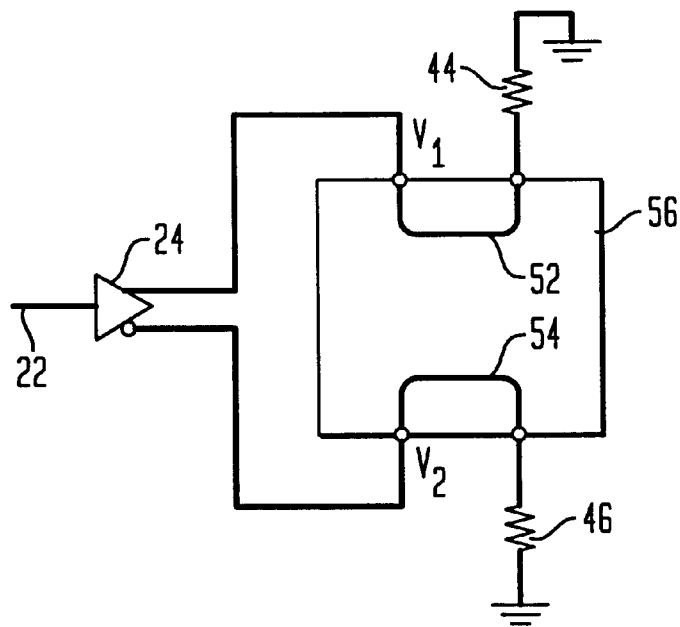
FIG. 2 [PRIOR ART]
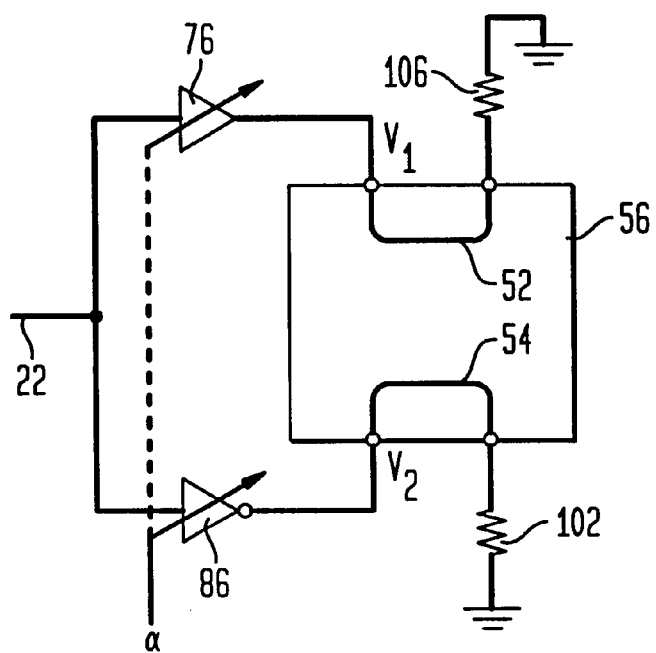

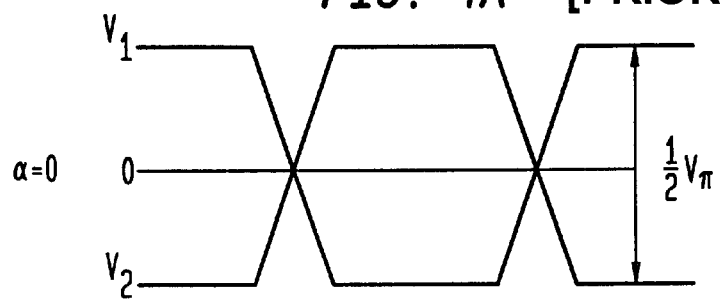
FIG. 4A [PRIOR ART]
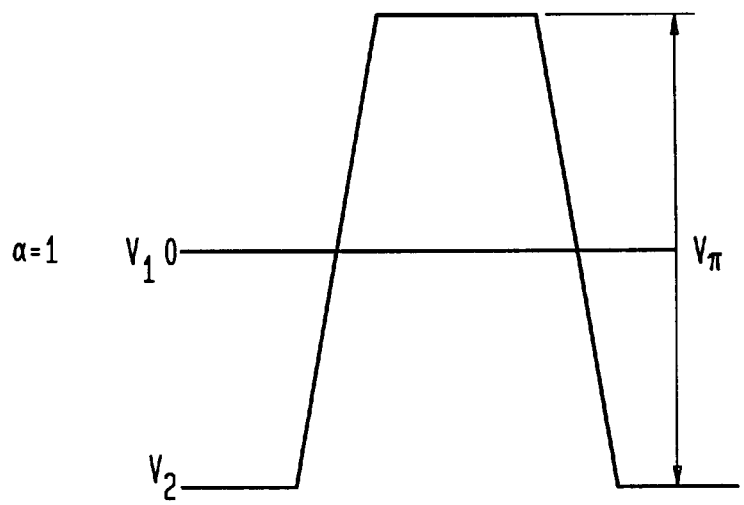
FIG. 4B [PRIOR ART]
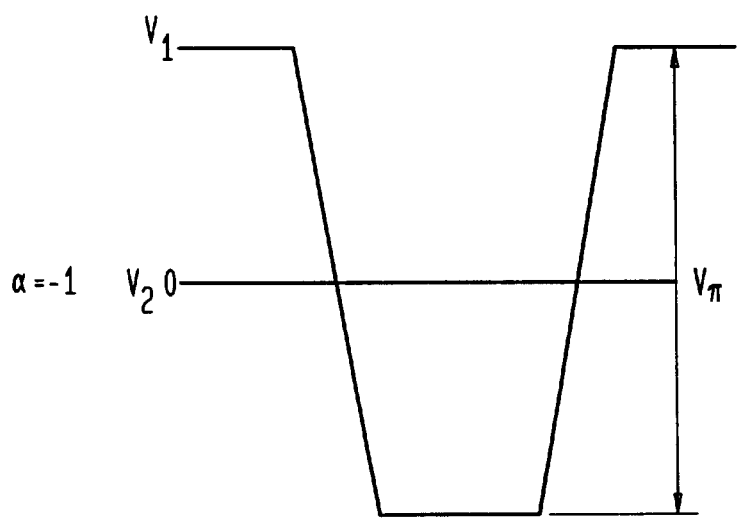
FIG. 4C [PRIOR ART]

LINBO₃ MACH-ZEHNDER MODULATOR WITH LOW DRIVE VOLTAGE REQUIREMENT AND ADJUSTABLE CHIRP

FIELD OF THE INVENTION

The present invention relates to operation of an electro-optic modulator, and more particularly to operation of a Mach-Zehnder Interferometer (MZI) type lithium niobate (LiNbO₃) modulator.

BACKGROUND OF THE INVENTION

Designers and manufacturers of data communications systems are under constant pressure to increase the data rate of their systems. One type of high-performance data communications system uses fiber-optic materials to transmit data over long distances at high speed in the form of modulated electromagnetic waves.

A popular method of modulating the electromagnetic waves employs a Mach-Zehnder Interferometer (MZI) type modulator. The operation of the MZI-type modulator is based on constructive/destructive interference among two optical paths. The optical paths are defined by an optical waveguide, known as a coplanar waveguide (CPW), implanted in a substrate housing the modulator. The substrate may be formed from lithium niobate (LiNbO₃). The LiNbO₃ modulator modulates the output optical signal by varying a phase difference between the electromagnetic waves traversing the two optical paths from 0 and 180 degrees, which is accomplished by applying a drive voltage ($V_\pi$) across electrodes of the modulator substrate. Application of the drive voltage ($V_\pi$) effects a change in optical refractive index of the optical paths of the optical waveguide via electrical fields generated in the substrate, thus altering the phase of lightwaves traversing the optical paths. The resulting change in phase of the lightwaves traversing the optical paths result in constructive/destructive interference patterns appearing in the recombined output optical signal, thereby permitting modulation of the output optical signal between two states (e.g., logical "1" and "0").

One problem in further increasing the attainable data communication rate is an attendant increase in drive voltage. High frequency conductor losses and phase velocity mismatch between electrical and optical signals tend to reduce the attainable bandwidth of the modulator. These issues may be resolved by reducing the total length L along which the electrode is coupled to the optical waveguide. Because the product $V_\pi$, the swing or drive voltage, times L is constant for a given modulator design, a reduction in L must be accompanied by a consequent increase in $V_\pi$. However, increased drive voltage $V_\pi$ may be impractical due to use of high-speed integrated circuits (ICs) to supply power to the modulator, since high-speed ICs are characterized by reduced transistor output breakdown voltages. Thus, increasing $V_\pi$ is undesired.

One approach to solving the drive voltage problem uses a push-pull arrangement for the modulator electrodes. FIG. 1 illustrates such a push-pull arrangement 20, in which modulation may be achieved by applying approximately half of the usual drive voltage $V_\pi$. Referring to FIG. 1, two arms 52, 54 of an MZI-type modulator 56 are coupled to a controller circuit which drives the arms 52, 54 with complementary voltages (opposing polarity). For example, data voltage source 24 applies complementary voltages $V_1$ and $V_2$ to arms 52, 54 respectively. The data voltage source 24 is coupled to the arms 52, 54, and applies drive voltages $V_1$, $V_2$ of equal amplitude and opposite polarity to the arms 52, 54 according to an applied data source signal input 22. The terminating resistors 44, 46 shown in FIG. 1 are not necessarily required and are included only to illustrate conventional termination well known in the art.

FIG. 3 illustrates a cross sectional view III—III (FIG. 1) showing electrical fields 114 generated in the vicinity of the arms 52, 54 and the optical waveguide 112 for this type of arrangement of the MZI-type modulator 56. It should be noted that the electrical fields 114 are shown for a z-cut crystal orientation of the substrate. For an x-cut crystal orientation of the substrate, the electrical fields 114 may be oriented differently.

For drive voltages $V_1$ and $V_2$ of opposing polarity, the final drive voltage requirements of the modulator is $V_\pi/2$. Thus, with the push-pull arrangement of FIG. 1, drive voltage requirements for the modulator are reduced approximately by a factor of 2.

Another problem affecting the development of high-speed modulators is adjustable chirp factor, due to the need to apply varying drive voltages to the arms of the modulator. Adjustable chirp modulators offer the ability to increase the transmission span of a data communications system employing optical fiber with particular dispersion properties. For a push-pull arrangement similar to that illustrated in FIG. 1, chirp may be adjusted by varying the relative amplitudes of the voltages applied to each arm 52, 54 of the MZI-type modulator 56.

FIG. 2 illustrates a modulator arrangement 40 in which the controller circuit includes first and second variable data voltage sources 76, 86. The push-pull modulator shown in FIG. 2 can produce chirp factors varying between −1 and +1, depending on the relative amplitudes of the drive voltages applied to the arms 52, 54. For example, for a chirp factor of zero (0), equal amplitude (but opposite polarity) swing voltages of $V_\pi/2$ may be used for $V_1$ and $V_2$, as shown in FIG. 4a. Chirp factor may be denoted by α, as shown in FIGS. 4a–4c. For a chirp factor of one (1), one of the arms, e.g., 52, may be driven with an amplitude of zero volt ($V_1$=0), while the other arm, e.g., 54, may be driven with a swing voltage $V_2$ of $V_\pi$ volts, as shown in FIG. 4b. For a chirp factor of negative one (−1), one of the arms, e.g., 52 may be driven with a swing voltage $V_1$ of $V_\pi$ volts, while the other arm, e.g., 54, may be driven at a voltage $V_2$ of zero volts, as shown in FIG. 4c. The first and second variable data voltage sources thus may vary the amplitudes of $V_1$ and $V_2$, to effect a variation in chirp factor, while maintaining their sum to keep $V_\pi$ constant. Note that for adjustable chirp, the variable data voltage sources 76, 86 each must be independently variable up to a swing voltage of $V_\pi$ volts.

Accordingly, there is a strong desire and need to develop an adjustable chirp modulator having reduced drive voltage requirements.

SUMMARY OF THE INVENTION

An electro-optic modulator and associated method are provided for an adjustable chirp arrangement exhibiting reduced drive voltage requirements. This and other advantages are achieved using an optical waveguide comprised of two pairs of coplanar modulation strips (CPS), the strips being driven by a controller circuit which applies voltages of equal amplitude and opposite polarity to the strips of each pair. The voltage applied to a first pair of strips may differ from the voltage applied to a second pair of strips, so that the chirp may be adjusted if desired.

The electro-optic modulator includes first and second pairs of coplanar modulation strips and a controller circuit including first and second drive circuits respectively coupled to the first and second pairs of coplanar modulation strips, wherein the first drive circuit drives the first pair using first and second differential signals, and the second drive circuit drives the second pair using third and fourth differential signals. The differential voltages are of equal amplitude and opposite polarity and reduce the required drive voltage by approximately a factor of two.

In another aspect of the invention, the first and second drive circuits include respective first and second variable data voltage sources. A chirp factor of the modulator may be adjusted by varying the output voltage of the respective first and second variable data voltage sources between approximately 0 volt and one-half of a final drive voltage of the modulator.

BRIEF DESCRIPTION OF THE DRAWINGS

The foregoing and other features and advantages of the invention will become more apparent from the detailed description of the exemplary embodiments of the invention given below with reference to the accompanying drawings in which:

FIG. 1 illustrates a conventional push-pull arrangement of a Mach-Zehnder Interferometer type modulator;

FIG. 2 illustrates a conventional push-pull arrangement for a Mach-Zehnder Interferometer type modulator with adjustable chirp;

FIG. 4a illustrates a timing diagram of the voltages $V_1$ and $V_2$ from FIG. 2 for a chirp factor of zero (0);

FIG. 4b illustrates a timing diagram of the voltages $V_1$ and $V_2$ from FIG. 2 for a chirp factor of one (+1);

FIG. 4c illustrates a timing diagram of the voltages $V_1$ and $V_2$ from FIG. 2 for a chirp factor of negative one (−1);

DETAILED DESCRIPTION OF THE INVENTION

The invention provides an apparatus and associated method for modulating electromagnetic waves generated by a transmitter for the purpose of data communication with a remote receiver. Although the invention is described below with reference to a lightwaves transmission system including optical signals that are generated by a laser, modulated using a Mach-Zehnder Interferometer type modulator, and transmitted via a fiber optic transmission medium for eventual reception by an optical receiver, it should be understood that optical signals are not required and the invention may be used with other types of electromagnetic wave transmission system.

In addition, while the invention is described below with reference to a modulator having a lithium niobate ($LiNbO_3$) substrate coupled to an integrated circuit (IC) controller, it should be understood that this combination is not required, for example, the invention may be used with any type of substrate suitable for electro-optic modulators, and the IC controller circuit or a portion thereof may be included on the same substrate.

Figure 3:
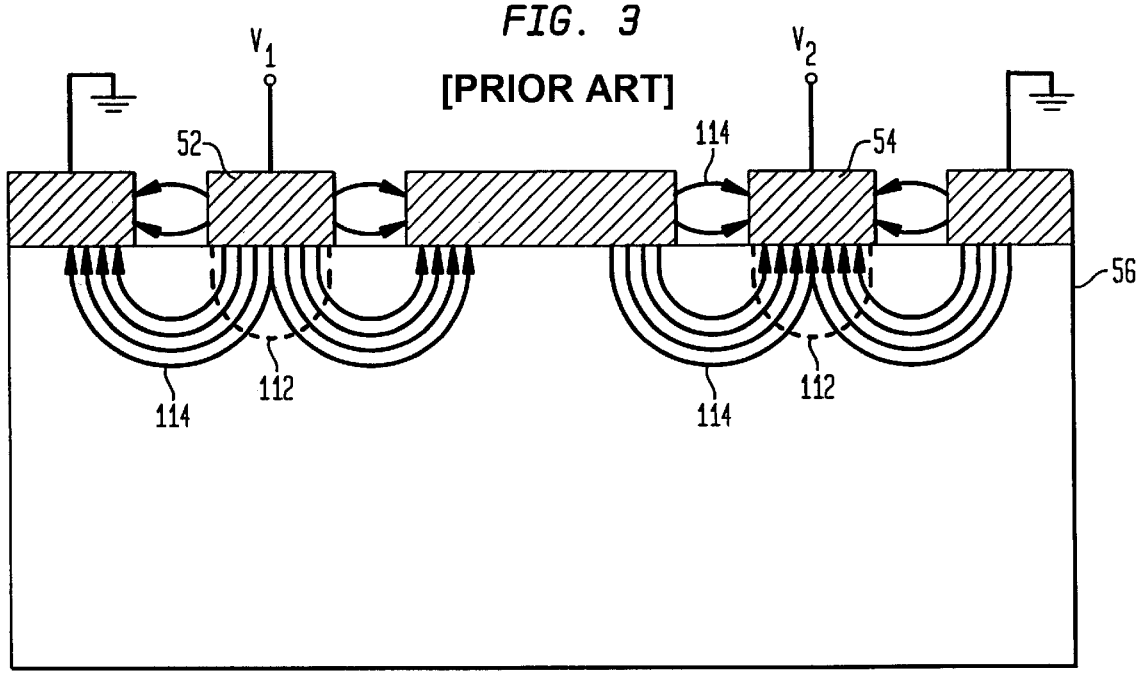
FIG. 3 illustrates a cross-sectional view of the Mach-Zehnder modulator shown in FIG. 1.
Figure 5:
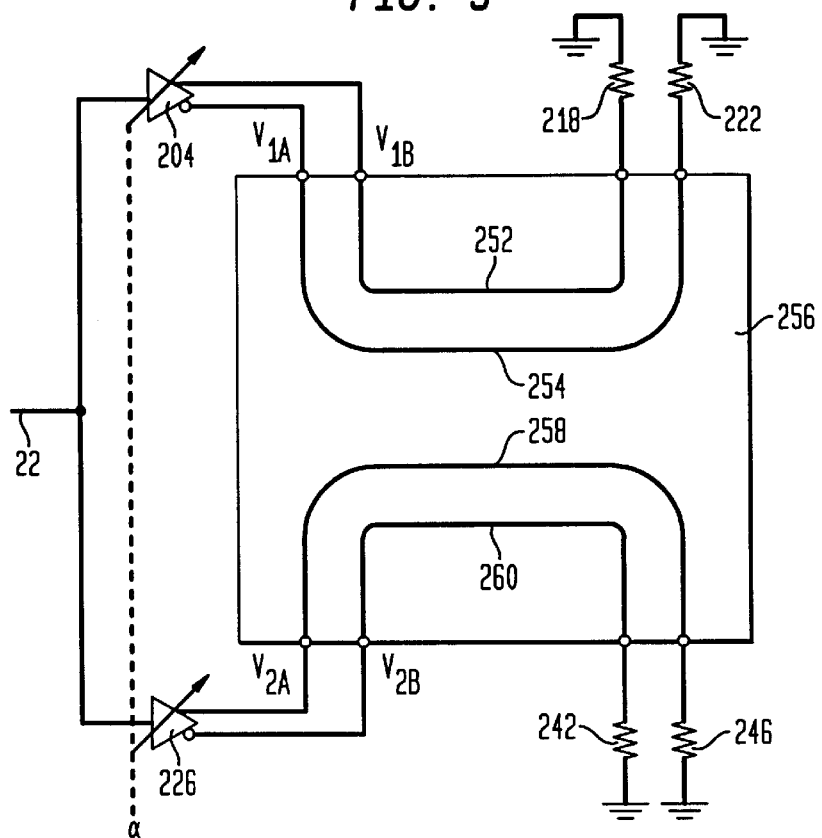
FIG. 5 illustrates an arrangement of an electro-optic modulator with adjustable chirp in accordance with an exemplary embodiment of the invention.

Exemplary embodiments of the invention will now be described with reference to FIGS. 5–11. FIG. 5 illustrates an electro-optic modulator arrangement 200 in accordance with the invention. A Mach-Zehnder Interferometer (MZI) type modulator 256 includes two pairs of coplanar modulation strips (CPS) 252, 254 (e.g., first pair) and 258, 260 (e.g., second pair). The coplanar modulation strips 252, 254, 258, 260 are coupled to a controller circuit which drives each strip 252, 254, 258, 260 to a desired amplitude and polarity so that the final drive voltage of the modulator 256 is $V_\pi'$. (The final drive voltage $V_\pi'$, of the modulator 256 employing coplanar modulation strips (CPS) may differ slightly from the aforementioned final drive voltage $V_\pi$ of the modulator 56 employing arms 52, 54 of a coplanar waveguide (CPW) due to slight modification in electrode length L, thus it is labeled as $V_\pi'$.)

The first pair of strips 252, 254 may be driven to voltages of equal amplitude and opposite polarity to generate a first-pair effective voltage. Likewise, the second pair of strips 258, 260 may be driven to voltages of equal amplitude and opposite polarity to generate a second-pair effective voltage. The potential difference between the first-pair effective voltage and the second-pair effective voltage may be controlled by the controller circuit to equal the final drive voltage $V_\pi'$.

The first pair of strips 252, 254 is coupled to a first drive circuit including a first variable data voltage source 204 and terminating resistors 218, 222. The second pair of strips 258, 260 is coupled to a second drive circuit including a second variable data voltage source 226 and terminating resistors 246, 242.

The first and second variable data voltage sources 204, 226 are coupled to an input data source 22. Each of the first and second variable data voltage sources 204, 226 may include an amplifier, e.g., a data source amplifier having two complementary data source signal outputs, as illustrated in FIG. 5. This configuration applies appropriate voltages to the strips 254, 252, 260, 258 according to the first and second complementary data source signal outputs of the variable data voltage sources 204, 226 such that strips 254 and 260 are driven at the same time to voltages $V_{1A}$ and $V_{2A}$, respectively, and drive voltages $V_{1B}$ and $V_{2B}$, are applied to strips 252 and 258, respectively. The first and second variable data voltage sources 204, 226 vary the amplitudes of $V_{1A}$ and $V_{2A}$ and $V_{1B}$ and $V_{2B}$ while maintaining the sum of the amplitudes of $V_{1A}$, $V_{1B}$, $V_{2A}$ and $V_{2B}$ equal to $V_\pi'$.

Figure 7A:
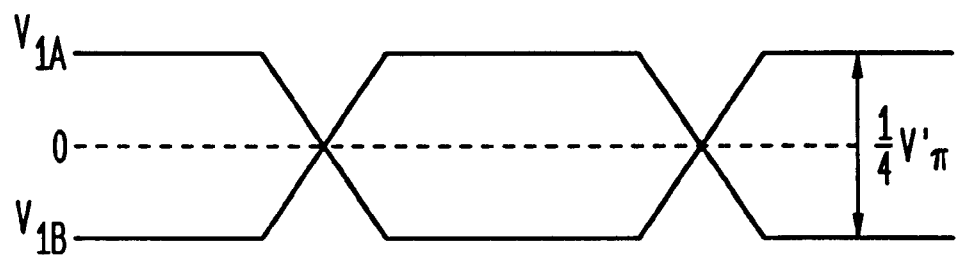
FIG. 7a illustrates a timing diagram of the voltages $V_{1A}$ and $V_{1B}$ from FIG. 5 for a chirp factor of zero (0)
Figure 7B:
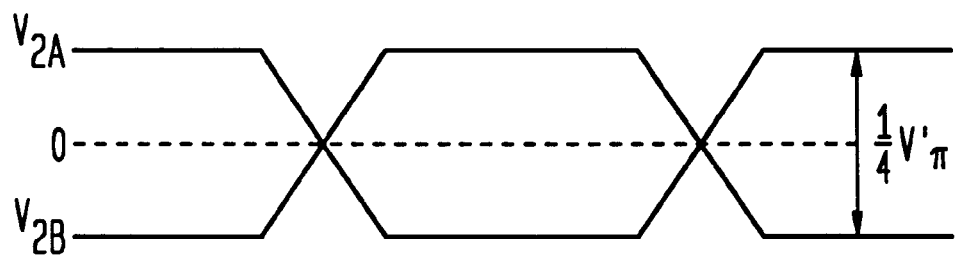
FIG. 7b illustrates a timing diagram of the voltages $V_{2A}$ and $V_{2B}$ from FIG. 5 for a chirp factor of zero (0)

For example, FIGS. 7a and 7b illustrate the amplitude and polarity of the drive voltages $V_{1A}$, $V_{1B}$, $V_{2A}$, $V_{2B}$ for a chirp factor (α) of zero. As shown in FIG. 7a, the swing voltages $V_{1A}$ and $V_{1B}$ are each $V_\pi'/4$, but $V_{1A}$ and $V_{1B}$ have opposite polarity, so that the potential difference applied to the first pair of strips 252, 254 is $V_\pi'/2$. Likewise, as shown in FIG. 7b, the swing voltages $V_{2A}$ and $V_{2B}$ have an amplitude of $V_\pi'/4$ and opposite polarity, so that the potential difference applied to the second pair of strips 258, 260 is $V_\pi'/2$. The first and second variable data voltage sources 204, 226 further ensure that the polarity of the potential difference $V_\pi'/2$ across the first pair of strips 252, 254 is opposite to the potential difference $V_\pi'/2$ across the second pair of strips 258, 260, so that the final potential difference applied across the modulator 256 is $V_\pi'$.

Referring back to FIG. 5, variable data voltage sources 204, 226 may permit adjustment of the amplitude of the drive voltages $V_{1A}$, $V_{1B}$, $V_{2A}$, $V_{2B}$, so that the chirp factor (α) may be adjusted. To ensure that the final potential difference across the modulator 256 remains $V_\pi'$, the amplitude of the voltages $V_{1A}$, $V_{1B}$, $V_{2A}$, $V_{2B}$ must be adjusted in a balanced manner.

For example, FIGS. 8a, 8b, 9a, and 9b illustrate adjustment of the voltages $V_{1A}$, $V_{1B}$, $V_{2A}$, $V_{2B}$ to achieve chirp factors (α) of positive one (+1) and negative one (−1). It should be understood that chirp factors other than those shown in FIGS. 8a, 8b, 9a and 9b may be used in accordance with the invention, for example, any chirp factor between −1 and +1 may be achieved by relatively varying the voltages $V_{1A}$, $V_{1B}$, $V_{2A}$, $V_{2B}$ in the balanced manner described.

Figure 8A:
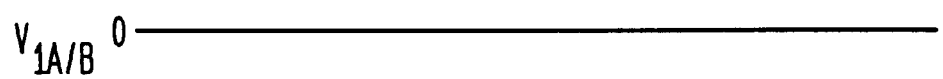
FIG. 8a illustrates a timing diagram of the voltages $V_{1A}$ and $V_{1B}$ from FIG. 5 for a chirp factor of one (+1)
Figure 8B:
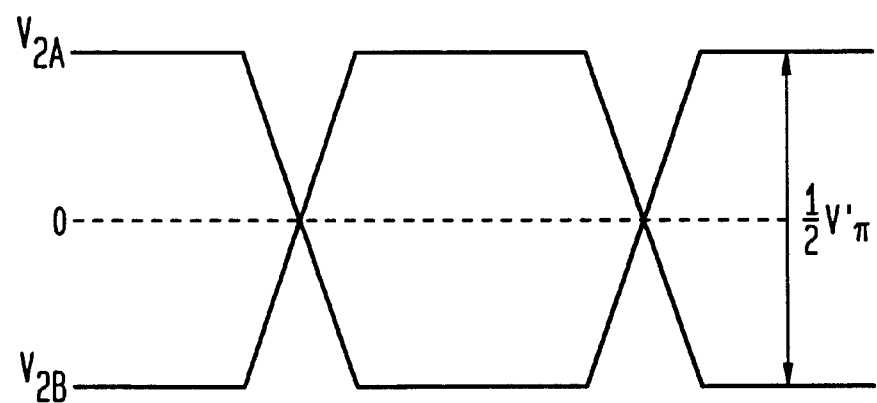
FIG. 8b illustrates a timing diagram of the voltages $V_{2A}$ and $V_{2B}$ from FIG. 5 for a chirp factor of one (+1)

As noted, FIGS. 8a and 8b show the voltages $V_{1A}$, $V_{1B}$, $V_A$, $V_{2B}$ required for a chirp factor (α) of positive one (+1). The first pair of strips 252, 254 may be driven at an amplitude of zero volts for voltages $V_{1A}$ and $V_{1B}$, as shown in FIG. 8a, while the second pair of strips 258, 260 may be driven at a voltage of $V_\pi/2$ volts for voltages $V_{2A}$ and $V_{2B}$, as shown in FIG. 8b.

Figure 9A:
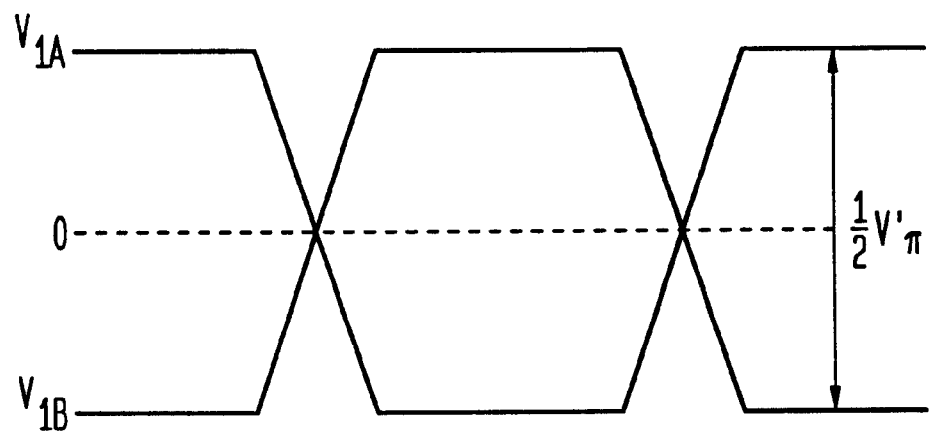
FIG. 9a illustrates a timing diagram of the voltages $V_{1A}$ and $V_{1B}$ from FIG. 5 for a chirp factor of negative one (−1)
Figure 9B:
FIG. 9b illustrates a timing diagram of the voltages $V_{2A}$ and $V_{2B}$ from FIG. 5 for a chirp factor of negative one (−1)

As also noted, FIGS. 9a and 9b show the voltages $V_{1A}$, $V_{1B}$, $V_{2A}$, $V_{2B}$ required for a chirp factor (α) of negative one (−1). The first pair of strips 252, 254 may be driven at a voltage of $V_\pi/2$ volts for voltages $V_{1A}$ and $V_{1B}$, as shown in FIG. 9a, while the second pair of strips 258, 260 may be driven at an amplitude of zero volts for voltages $V_{2A}$ and $V_{2B}$, as shown in FIG. 9b.

Note that to adjust the chirp factor between −1 and +1, the variable data voltage sources 204, 226 (FIG. 5) each must be independently variable up to a swing voltage of $V_\pi/2$ volts. This represents a significant improvement over the conventional arrangement 40 (FIG. 2), which required that each variable data voltage source 76, 86 must be variable up to a swing voltage of $V_\pi$ volts. Thus, the drive voltage requirements for adjustable chirp have been reduced approximately by a factor of 2 with the present invention.

Figure 6:
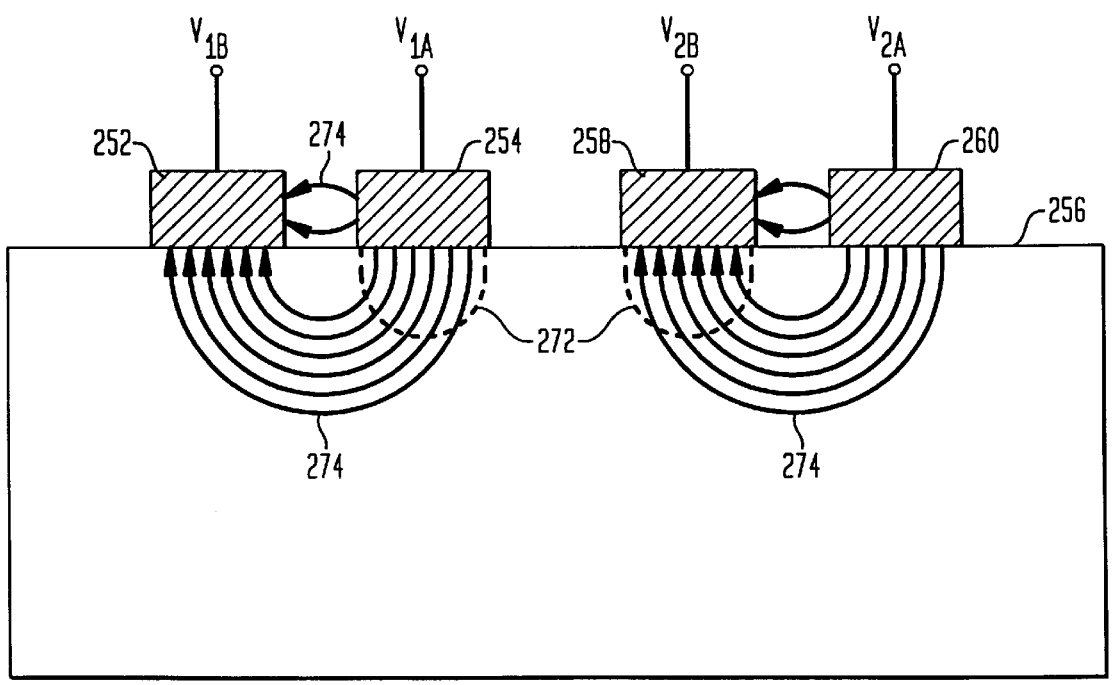
FIG. 6 illustrates a cross-sectional view of the electro-optic modulator shown in FIG. 5.

FIG. 6 illustrates a cross sectional view VI—VI (FIG. 5) showing electrical fields 274 generated in the vicinity of the strips 252, 254, 258, 260 and the optical waveguide 272 for an electro-optic modulator 256 arranged in accordance with an exemplary embodiment of the present invention. It should be noted that the electrical fields 274 are illustrated for a z-cut crystal orientation of the substrate. For example, for a z-cut crystal orientation, the electrical fields 274 may be oriented approximately perpendicular to a plane passing through both arms of the optical waveguide 272.

Figure 11:
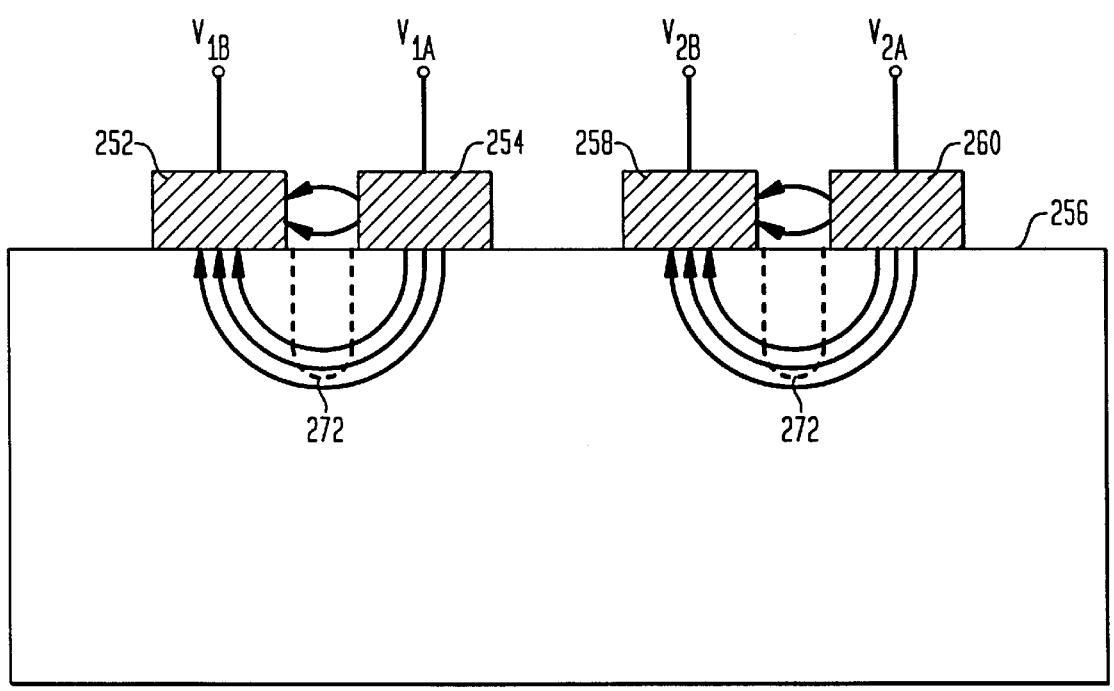
FIG. 11 illustrates a cross-sectional view of an electro-optic modulator formed in accordance with another exemplary embodiment of the invention.

As shown in FIG. 11, another exemplary embodiment of the invention may employ an x-cut crystal orientation of the substrate, requiring that the optical waveguide 272 and the electrical fields 274 be oriented differently. Referring to FIG. 11, for an x-cut crystal orientation of the substrate, the optical waveguide 272 may be placed between the first and second strips of each pair, and the electrical fields 274 may be oriented approximately parallel to a plane passing through the arms of the optical waveguide 272.

Figure 10:
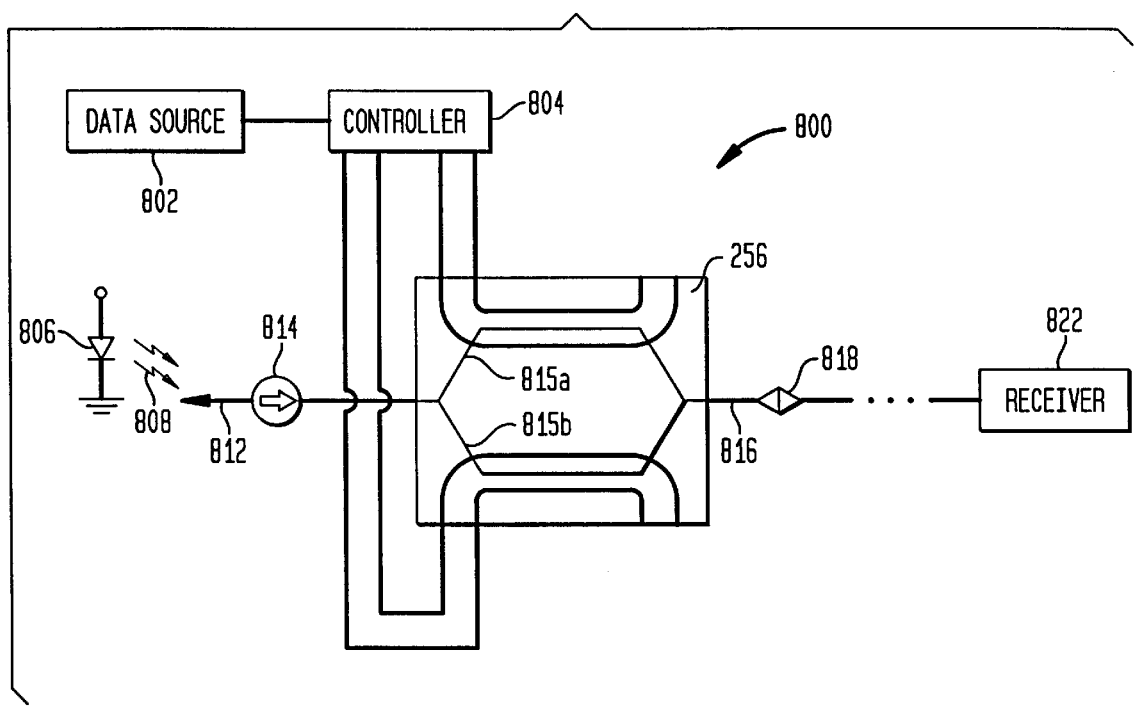
FIG. 10 illustrates a data communications system formed in accordance with another exemplary embodiment of the invention.

FIG. 10 illustrates an exemplary data communications system 800 formed in accordance with another exemplary embodiment of the invention. Data communications system 800 includes a modulator 256 and a controller circuit 804 formed in accordance with the arrangement 200 described with reference to FIGS. 5–9. Referring to FIG. 10, the data communications system 200, which may be a fiber optic communications system, for example, generally comprises a laser 806, for example, a laser diode, that produces optical waves 808 that propagate into lensed optical fiber 812, also known as a fiber pigtail. An isolator 814 may optionally be coupled between the lensed optical fiber 812 and the modulator 256 to reduce reflections back toward the laser from the rest of the system 800. The optical waves 808 continue propagation through the modulator 256, which divides the waves 808 into two arms 815a, 815b of an optical waveguide, and then the waves 808 are recombined into a single optical signal. The system 800 includes optical fiber 816 optionally interconnected with optical amplifiers 818 for transmission of the optical signal over a distance to the receiver 822. The modulator 256 includes two pairs of coplanar modulation strips (CPS) 252, 254, 258, 260 formed in accordance with the invention and coupled to a controller circuit 804 also formed in accordance with the invention. It should be noted that FIG. 10 is merely representative of many different types of data communications system architectures which may employ the invention.

An arrangement 200 including the modulator 256 has been described that improves the performance of a data communications system by reducing the drive voltage requirements for an adjustable chirp, Mach-Zehnder Interferometer (MZI) type modulator. These and other advantages are achieved by using two pairs of coplanar modulation strips (CPS) 252, 254 (e.g., first pair) and 258, 260 (e.g., second pair), and driving the strips of each pair with drive voltages of equal amplitude and opposite polarity. The amplitudes of the drive voltages applied to a first pair of strips (e.g., 252, 254) may be varied relative to the amplitude of the drive voltages applied to a second pair of strips (e.g., 258, 260) in a balanced manner to adjust a chirp factor of the modulator 256.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters patent of the United States is:

1. An electro-optic modulator, comprising:
   first and second pairs of coplanar modulation strips; and
   a controller circuit including first and second drive circuits respectively coupled to said first and second pairs of coplanar modulation strips,
   wherein said first drive circuit drives said first pair of modulation strips in response to an applied input signal using first and second differential signals, and said second drive circuit drives said second pair of modulation strips in response to said applied input signal using third and fourth differential signals.

2. A modulator as in claim 1, wherein said first and second drive circuits drive said modulator in a push-pull fashion.

3. A modulator as in claim 1, wherein said first and second drive circuits include respective first and second variable data voltage sources.

4. A modulator as in claim 3, wherein said first and second drive circuits are configured to adjust a chirp factor in accordance with a variation of said first and second variable data voltage sources.

5. A modulator as in claim 1, wherein said first drive circuit includes a first data voltage source including first and second terminals each respectively coupled to one strip of said first pair of coplanar modulation strips to respectively provide said first and second differential signals.

6. A modulator as in claim 5, wherein said second drive circuit includes a second data voltage source including third and fourth terminals each respectively coupled to one strip of said second pair of coplanar modulation strips to respectively provide said third and fourth differential signals.

7. A modulator as in claim 6, wherein said controller circuit further comprises an input data source terminal coupled to said first and second data voltage sources, said input data source terminal supplying said applied input signal.

8. A modulator as in claim 7, wherein said first and second data voltage sources are variable data voltage sources.

9. A modulator as in claim 8, wherein said first and second drive circuits are configured to adjust a chirp factor in accordance with a variation in an output voltage of said respective first and second variable data voltage sources.

10. A modulator as in claim 9, wherein said output voltage of each of said first and second variable data voltage sources is variable between approximately 0 volt and one half of a final drive voltage of the modulator.

11. A modulator as in claim 10, wherein each of said first and second variable data voltage sources is configured to output a voltage of approximately one-quarter of said final drive voltage of the modulator, resulting in a chirp factor of approximately zero.

12. A modulator as in claim 10, wherein said first variable data voltage source is configured to output a voltage of approximately zero and said second variable data voltage source is configured to output a voltage of approximately one-half of said final drive voltage of the modulator, resulting in a chirp factor of approximately positive one (+1).

13. A modulator as in claim 10, wherein said first variable data voltage source is configured to output a voltage of approximately one-half of said final drive voltage of the modulator and said second variable data voltage source is configured to output a voltage of approximately zero, resulting in a chirp factor of approximately negative one (−1).

14. A modulator as in claim 1, wherein said first and second pairs of coplanar strips are formed using a $LiNbO_3$ substrate.

15. A modulator as in claim 14, wherein said LiNbO3 substrate has a z-cut crystal orientation.

16. A modulator as in claim 15, further comprising an optical waveguide placed below one strip of each pair of coplanar modulation strips.

17. A modulator as in claim 16, wherein said first and second pairs of coplanar modulation strips generate an electrical field perpendicular to a plane of the optical waveguide.

18. A modulator as in claim 14, wherein said LiNbO3 substrate has an x-cut crystal orientation.

19. A modulator as in claim 18, further comprising an optical waveguide placed between first and second strips of each pair of coplanar modulation strips.

20. A modulator as in claim 19, wherein said first and second pairs of coplanar modulation strips generate an electrical field parallel to a plane of the optical waveguide.

21. An electro-optic modulator, comprising:
first and second pairs of coplanar modulation strips; and
a controller circuit including first and second drive circuits respectively coupled to said first and second pairs of coplanar modulation strips, wherein said first drive circuit drives said first pair using first and second differential signals respectively applied to first and second strips of said first pair, and said second drive circuit drives said second pair using third and fourth differential signals respectively applied to third and fourth strips of said second pair,
wherein said first and second drive circuits include respective first and second variable data voltage sources, and wherein output voltage of each of said first and second variable data voltage sources is variable between approximately 0 volt and one-half of a final drive voltage of the modulator.

22. A modulator as in claim 21, wherein said controller circuit is configured to adjust a chirp factor by varying said first and second variable data voltage sources.

23. A modulator as in claim 21, wherein each of said first and second variable data voltage sources is configured to output a voltage of approximately one-quarter of said final drive voltage of the modulator, resulting in a chirp factor of approximately zero.

24. A modulator as in claim 21, wherein said first variable data voltage source is configured to output a voltage of approximately zero and said second variable data voltage source is configured to output a voltage of approximately one-half of said final drive voltage of the modulator, resulting in a chirp factor of approximately positive one (+1).

25. A modulator as in claim 21, wherein said first variable data voltage source is configured to output a voltage of approximately one-half of said final drive voltage of the modulator and said second variable data voltage source is configured to output a voltage of approximately zero, resulting in a chirp factor of approximately negative one (−1).

26. A modulator as in claim 21, wherein said first drive circuit includes a first variable data voltage source including first and second terminals each respectively coupled to one strip of said first pair of coplanar modulation strips to respectively provide said first and second differential signals.

27. A modulator as in claim 21, wherein said second drive circuit includes a second variable data voltage source including third and fourth terminals each respectively coupled to one strip of said second pair of coplanar modulation strips to respectively provide said third and fourth differential signals.

28. A data communications system, comprising:
an optical transmitter;
a data source; and
a transmission medium configured to transmit data from said data source using said transmitter and an electro-optical modulator, said electro-optical modulator comprising:
first and second pairs of coplanar modulation strips; and
a controller circuit including first and second drive circuits respectively coupled to said first and second pairs of coplanar modulation strips,
wherein said first drive circuit drives said first pair using first and second differential signals, and said second drive circuit drives said second pair using third and fourth differential signals.

29. A data communications system as in claim 28, further comprising a receiver coupled to said transmission medium that receives said data.

30. A method of operating an electro-optic modulator, comprising:

providing first and second pairs of coplanar modulation strips;

coupling said first and second pairs of coplanar modulation strips to respective first and second drive circuits;

driving said first pair of modulation strips using first and second differential signals, wherein said first and second differential signals are each generated by said first drive circuit in response to an applied input signal, and driving said second pair of modulation strips using third and fourth differential signals, wherein said third and fourth differential signals are each generated by said second drive circuit in response to said applied input signal.

31. A method as in claim 30, further comprising adjusting a chirp factor by varying first and second variable data voltage sources respectively included in said first and second drive circuits.

32. A method as in claim 31, wherein said first and second variable data voltage sources are varied such that when an amplitude of said first variable data voltage source is increased an amount, an amplitude of said second variable data voltage source is simultaneously decreased said amount.

33. A method as in claim 32, wherein said chirp factor is adjusted to a value of approximately zero by configuring each of said first and second variable data voltage sources to an amplitude of approximately one-quarter of a final drive voltage of the modulator.

34. A method as in claim 32, wherein said chirp factor is adjusted to a value of approximately positive one (+1) by configuring said first variable data voltage source to an amplitude of approximately zero volt and said second variable data voltage source to an amplitude of approximately one-half of a final drive voltage of the modulator.

35. A method as in claim 32, wherein said chirp factor is adjusted to a value of approximately negative one (−1) by configuring said first variable data voltage source to an amplitude of approximately one-half of a final drive voltage of the modulator and said second variable data voltage source to an amplitude of approximately zero volts.

36. A method as in claim 30, wherein said first and second differential signals are respectively applied to said first pair of coplanar modulation strips through respective first and second complementary terminals respectively coupled to a first data voltage source, and said third and fourth differential signals are respectively applied to said second pair of coplanar modulation strips through respective third and fourth complementary terminals respectively coupled to a second data voltage source.

37. A method as in claim 36, further comprising coupling an input of said first and second data voltage sources to an input data source terminal.

* * * * *